United States Patent [19]

Shiozaki

[11] Patent Number: 4,866,460

[45] Date of Patent: Sep. 12, 1989

[54] INK JET RECORDING HEAD AND BASE PLATE THEREFOR

[75] Inventor: Atsushi Shiozaki, Isehara, Japan

[73] Assignee: Canon Kabushiki Kaisha, Tokyo, Japan

[21] Appl. No.: 149,089

[22] Filed: Jan. 27, 1988

[30] Foreign Application Priority Data

Feb. 4, 1987 [JP] Japan .................................. 62-023994

[51] Int. Cl.[4] .......................... G01D 15/16; B41J 3/04

[52] U.S. Cl. ................................................ 346/140 R

[58] Field of Search ........................................ 346/140

[56] References Cited

U.S. PATENT DOCUMENTS 4,353,079 10/1982 Kawanabe ...................... 346/140 R
4,429,321 1/1984 Matsumoto ...................... 346/140 R
4,602,261 7/1986 Matsuda et al. ................ 346/140 R
4,631,555 12/1986 Ikeda et al. ..................... 346/140 R
4,686,544 8/1987 Ikeda et al. ..................... 346/140 R
4,695,853 9/1987 Hackleman ......................... 346/140
4,720,716 1/1988 Ikeda et al. ..................... 346/140 R
4,725,859 2/1988 Shibata et al. .................. 346/140 R

FOREIGN PATENT DOCUMENTS 3443560 6/1985 Fed. Rep. of Germany .
033471 2/1983 Japan .

*Primary Examiner*—Joseph W. Hartary
*Attorney, Agent, or Firm*—Fitzpatrick, Cella, Harper & Scinto

[57] ABSTRACT

This specification discloses a base plate for an ink jet recording head provided with an electrothermal converting member having a substrate, a pair of first electrodes provided at a predetermined interval on the substrate, a pair of second electrodes provided at an interval greater than the predetermined interval on the pair of first electrodes, and a heat generating resistance member electrically connected to the respective ones of the pairs of electrodes in at least a portion thereof. The specification also discloses an ink jet recording head having such base plate.

9 Claims, 2 Drawing Sheets

INK JET RECORDING HEAD AND BASE PLATE THEREFOR

BACKGROUND OF THE INVENTION

1. Field of the Invention

This invention relates to an ink jet recording head and a base plate therefor.

2. Related Background Art

The ink jet recording method is a recording method whereby ink (recording liquid) is discharged from a discharge port provided in a recording head and the discharged ink is caused to adhere to a recording medium such as paper to thereby accomplish recording. Advantages of such a method include advantages such as very little noise being produced, the capability of high-speed recording and no necessity of using paper of special construction for recording, and recording heads of various types have heretofore been developed.

Above all, a recording head of the type in which heat energy is caused to act on ink to discharge the ink from a discharge port has advantages such as good responsiveness to recording signals and the ease with which a number of discharge ports are disposed at high density.

As a recording head of such type which utilizes heat energy as ink discharging energy, there is known a recording head of a construction in which electro-thermal converting elements having a heat generating resistance member layer and electrodes are arranged on a substrate, the converting elements having as required a protective film provided above the portion thereof which contacts liquid, and a top plate formed with liquid paths and a liquid chamber joined thereto.

The ink discharging energy in a recording head utilizing this system is generally imparted by an electro-thermal converting element having a pair of electrodes and a heat generating resistance member located between the electrodes. That is, when an electric current is applied to the electrodes to cause the heat generating resistance member to generate heat, the ink in the liquid path in contact with or near the heat generating resistance element is momentarily heated and bubbles are created therein. Ink droplets are discharged from the discharge port by the change in volume resulting from the momentary expansion and contraction of volume caused by the creation of the bubbles.

In the recording head using the electro-thermal converting element as described above, other portions than the heat generating member are generally protected by an organic resin film to prevent the occurrence of leakage or short circuit of the electric current through the ink. In such case, the organic film has not been provided on the heat generating member of the heat generating portion because it adversely affects the heat conduction, or because of its heat resisting property. Also, because of its heat resisting property or the like, it has been necessary that the organic film be formed separately from the heat generating member of the heat generating portion. However, the separation of the organic film from the heat generating member of the heat generating portion has sometimes led to the problem that the electrodes connected to the heat generating member can no longer be protected and the reliability is reduced. As a countermeasure for this, it has been practiced to provide an intermediate area between the heat generating member and the electrodes and form in this intermediate area the end of the organic protective film which is adjacent to the heat generating member.

As such method, there is a method of widening the pattern width of the heat generating resistance member as disclosed, for example, in Japanese Laid-Open patent application No. 033471/1983, but according to this method, in some cases, a so-called heat spot of high current density has been produced at the corner in which the pattern of the heat generating member is thinner, thereby adversely affecting the creation of bubbles. Also, in German Pat. No. 3443560, there is proposed a construction in which the thickness of the portions of the electrodes which are near the heat generating member is made small, but a method of making the thickness of a part small by a single electrode layer is difficult to control, and a method of using two layers and selectively etching the two layers has presupposed that the heat generating member and the two kinds of electrodes can be selectively etched, and has suffered from the problem that the limitations in the usable materials and the etching liquid or the etching method are severe.

That is, there have been problems still left to be solved in search of a more ideal electro-thermal converting element in which the protection of the electro-thermal converting element and the prevention of leakage or short circuit are accomplished more perfectly and which does not adversely affect the creation of bubbles.

SUMMARY OF THE INVENTION

It is a primary object of the present invention to solve the above-noted problems.

More specifically, it is an object of the present invention to provide an ink jet recording head having an electro-thermal converting member of a construction which can increase the degree of freedom of materials usable for a protective film, etc., and a base plate for use in such recording head.

It is also an object of the present invention to provide an ink jet recording head of higher durability in which the protective film is not in contact with a high temperature portion, and a base plate for use in such recording head.

It is also an object of the present invention to provide an ink jet recording head having a discharge port for discharging ink therethrough, and an electrothermal converting member for generating heat energy utilized to discharge said ink, wherein said electrothermal converting member has a pair of first electrodes provided at a predetermined interval on a substrate, a pair of second electrodes provided at an interval greater than said predetermined interval on said pair of first electrodes, and a heat generating resistance member electrically connected to the respective ones of said pairs of electrodes in at least a portion thereof, and a base plate for use in such head.

DESCRIPTION OF THE PREFERRED EMBODIMENTS

The present invention will herein after be described with respect to an embodiment thereof.

Figure 1:
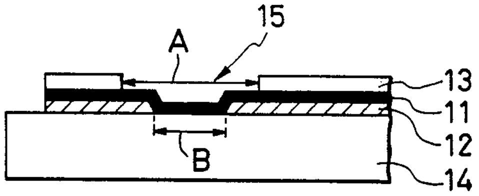
FIGS. 1 to 4 show the characteristic portions of embodiments of the ink jet recording head of the resent invention.

FIG. 1 schematically shows the characteristic portions of the typical ink jet recording head of the present invention. As shown in FIG. 1, in the present invention, electrodes 12 and 13 have been provided above and below a heat generating resistance member layer 11 on a substrate 14. That is, the recording head has been made into a construction in which the heat generating resistance layer 11 is partly interposed between the first and second electrodes 12 and 13. Also, the second electrodes 13 have been formed with a greater interval, or space, therebetween than the first electrodes 12. As shown in FIG. 1, arrow A represents a greater space between the second electrodes 13 than arrow B between the first electrodes 12.

In the present invention, the portion of the heat generating resistance member 11 between the opposed electrodes which is electrically connected to the electrodes has provided an energy source which generates heat energy for discharging ink from a discharge port and causing the discharged ink to fly. That is, an electrothermal converting member 15 has been constructed of the electrodes 12, 13 and the heat generating resistance member 11.

The characteristic portions of the ink jet recording head of the present invention could typically be made in the following manner.

A layer (Ta) providing the first electrodes 12 has been laminated on a substrate 14 (Si) whose surface has been made non-conductive, by the sputtering method, and has been made into a counter-polar shape by the use of the photolithographic process or the like. Then, the heat generating resistance layer 11 (Ta alloy) and a layer (A1) providing the second electrodes 13 have likewise been laminated by sputtering, and patterning has been made with the second electrodes 13 being separated more from the heat generating resistance member portion than the first electrodes 12. Also, the heat generating resistance layer 11 has been pattern-formed by the photolithographic technique so as to assume a desired shape of heat generating resistance member between the first electrodes.

Figure 2A:
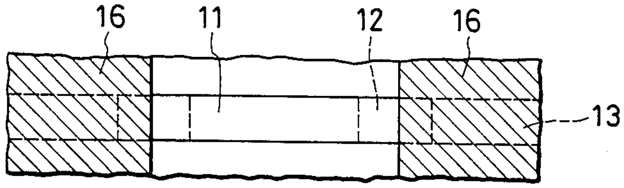
FIG. 2A is the plane view of the structure of FIG. 2B.
Figure 2B:
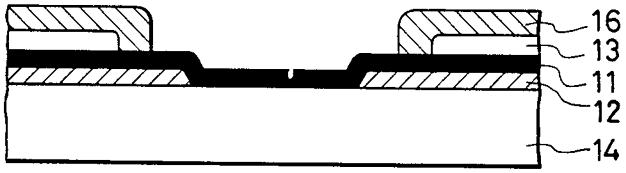

Thereafter, an organic protective material such as photosensitive resin (polyimide) has been laminated by spin coat, whereafter patterning has been made and the heat generating portion and the other portion of a part of the first electrode have been protected by an organic protective film 16 as shown in FIGS. 2A and 2B.

As the material of the organic protective film 16, use could be made of a material chemically stable and excellent in the property of intimate contact with the ground, for example, photosensitive polyimide resin such as PIQ produced by Hitachi Kasei Co., Ltd., PYRALIN produced by Du Pont, Inc., JSR-CBR produced by Nippon Synthetic Rubber Co., Ltd. or Photoneece produced by Toray Co., Ltd.

As regards the width of the pattern, the widths of the respective layers needed not be equal and uniform.

Figure 4:
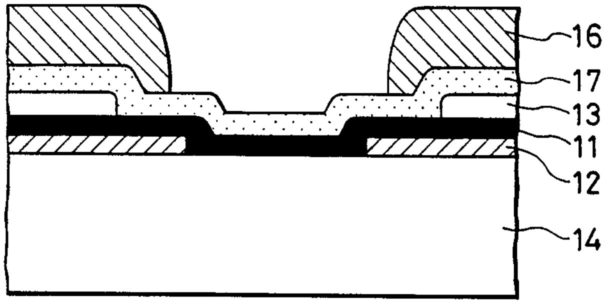

In the present invention, the structure as shown in FIG. 4 has also led to a good result. That is, the structure shown in FIG. 4 differs from the structure described in connection with FIGS. 2A and 2B in that an inorganic protective film 17 is provided between the organic protective film 16 and the second electrodes 13. In this case, the inorganic protective film 17 by attaching $SiO_2$ to the thickness of the order of 1 $\mu m$ by the sputtering method.

Figure 5:
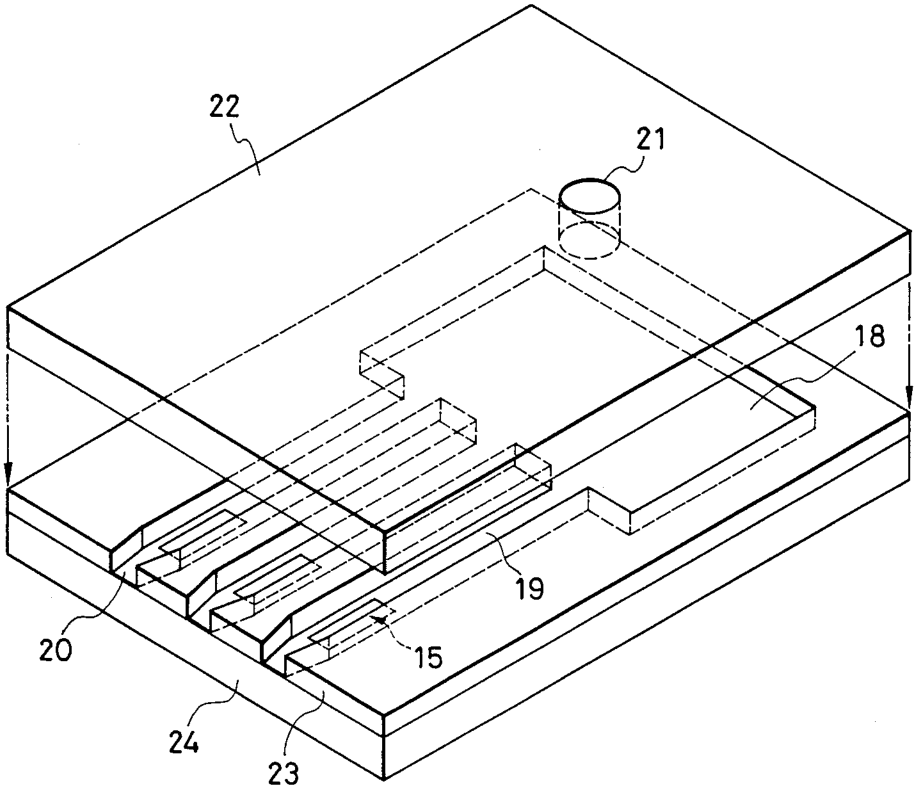
FIG. 5 is a schematic view showing a form of the ink jet recording head to which the present invention is applied.

Finally, the body of the ink jet recording head of the present invention is shown in FIG. 5.

In FIG. 5, the reference numeral 15 designates electro-thermal converting elements, the reference numeral 18 denotes a liquid chamber, the reference numeral 19 designates liquid paths, the reference numeral 20 denotes discharge ports, the reference numeral 21 designates a supply port, the reference numeral 22 denotes a top plate, the reference numeral 23 designates a liquid path wall, and the reference numeral 24 denotes a base plate for the ink jet recording head.

As shown in FIG. 5, the liquid paths 19 and the discharge ports 20 communicating with the liquid paths 19 have been formed correspondingly to the electrothermal converting elements 15 of the base plate 24 for the ink jet recording head. Also, the liquid paths 19 have been communicated with the liquid chamber 18. Actually, these discharge ports 20, liquid paths 19 and liquid chamber 18 have been formed by joining the top plate 22 to the liquid path wall (preferably made of photosensitive resin) formed on the base plate 24 for the ink jet recording head. The top plate 22 has been formed with the supply port 21, through which ink has been supplied into the liquid chamber 18, i.e., into the recording head.

When an ink jet recording head was made with the aforedescribed substrate used as the base plate of the ink jet recording head of such a construction and discharge of liquid was effected, stable liquid droplets could be formed for a long time and the durability was satisfactory.

The present invention has been shown with respect to an example in which the electrodes, the heat generating resistance member layer and the inorganic protective layer have been formed by the sputtering method, whereas these could be formed not only by the sputtering method, but also by numerous film forming means. Particularly, the vacuum deposition method is suitable for elimination of dust and for making the layers minute and thus, it is preferable.

Of course, for the formation of the organic protective film, use can be made of not only the above-mentioned spin coat, but also other numerous film forming means including the roll coat.

It should be noted that the materials of the substrate, the first and second electrodes, the heat generating resistance member layer, the protective films, etc. are not limited to the above-mentioned materials. The materials used for these portions may be any other materials as long as they ensure the functions of the respective portions to be fully performed.

Figure 3:
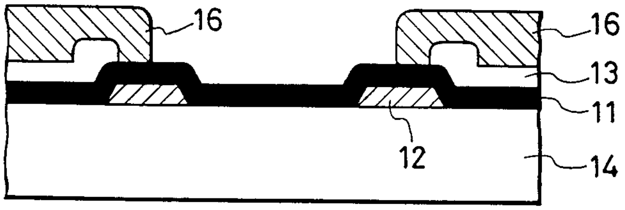

To obtain the advantages as previously described, the first electrode 12 could be provided only near the heat generating resistance member, as shown in FIG. 3.

In addition, the form of the ink jet recording head formed by the use of the substrate of the present invention is not limited to the form shown in FIG. 5, because the substrate of the present invention can be used in most ink jet recording heads utilizing heat energy.

As previously described, the present invention has been constructed with the second electrodes furthest from the substrate being separated more from the heat generating resistance member than the first electrodes nearest to the substrate. That is, the portions between the first electrodes and the vicinity thereof provides the heat generating resistance member. Thus, according to the present invention, the first electrodes can first be formed and therefore, there are few limitations in making them and the material thereof can be widely selected. For example, it is also easy to form the first electrodes of the same material as the heat generating resistance member layer which constitutes the heat generating resistance member.

This is particularly important in the case of a form in which no inorganic insulating film is provided on the heat generating resistance member. To prevent the corrosion by the battery effect, it is necessary to select materials having similar oxidation-reduction potentials for the heat generating resistance member and the first electrodes, and in the present invention, the selection which satisfies such a condition becomes easy.

That is, according to the present invention, only similar materials can be employed for the portions which contact the ink and therefore, the occurrence of the corrosion by the battery effect can be prevented.

Also, according to the present invention, in some portion of the first electrodes, the current density is reduced and the heat generation temperature becomes lower in the heat generating resistance member and therefore, if the surface is protected so that this low temperature portion is the end of the organic resin film, it will be avoided that the organic film is deteriorated in durability by heat (see FIG. 2B).

As described above, in the present invention, there are the effects that the formation of the first electrodes which provide the base layer is easy and the degree of freedom of usable material is great and that where there is provided an organic film which protects the electrode portion, the protective film does not contact the high temperature portion and therefore the durability thereof is improved.

I claim:

1. A base plate for an ink jet recording head comprising:

a substrate; and electro-thermal converting means comprising a pair of first electrodes having a predetermined space therebetween and being disposed on said substrate, a heat generating resistance member provided on said pair of first electrodes and electrically connected to at least a portion of said first electrodes, and a pair of second electrodes having a space therebetween greater than said predetermined space between said first electrodes and being electrically connected to at least a portion of said heat generating resistance member.

2. An ink jet recording head according to claim 1, further comprising a protection layer disposed on said pair of second electrodes.

3. An ink jet recording head according to claim 2, wherein said protection layer includes an organic material.

4. An ink jet recording head according to claim 2, wherein said protection layer comprises an inorganic material layer and an organic material layer.

5. An ink jet recording head having a discharge port for discharging ink therethrough and an electro-thermal converting member for generating heat energy utilized to discharge the ink, said electrothermal converting member comprising:

a pair of first electrodes having a space therebetween and being disposed on a substrate, a heat generating resistance member provided on said first electrodes and electrically connected to at least a portion of said first electrodes, and a pair of second electrodes having a space therebetween greater than said predetermined space between said first electrodes and being electrically connected to at least a portion of said heat generating resistance member.

6. An ink jet recording head according to claim 5, wherein said first electrodes and said heat generating resistance member include the same material.

7. An ink jet recording head according to claim 5, further comprising a protection layer disposed on said pair of second electrodes.

8. An ink jet recording head according to claim 7, wherein said protection layer includes an organic material.

9. An ink jet recording head according to claim 7, wherein said protection layer comprises an inorganic material layer and an organic material layer.

* * * * *